June 19, 1934.  N. E. JERSEY  1,963,847
CUTTING EDGE FOR IMPLEMENTS
Filed Aug. 28, 1931
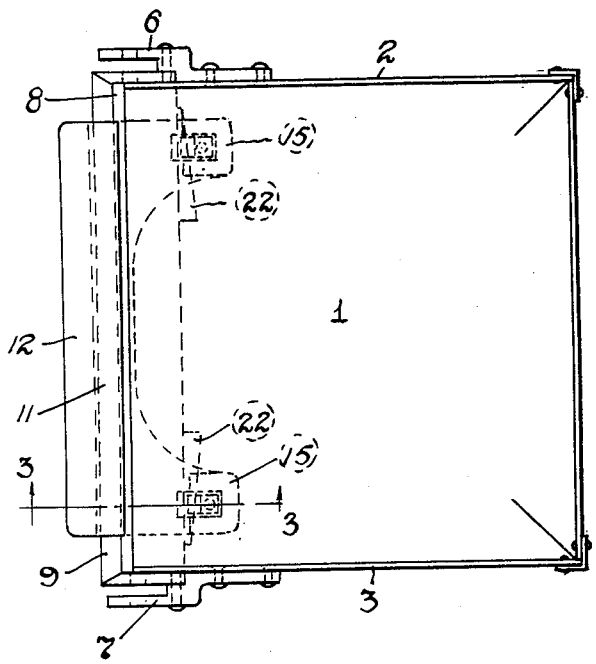
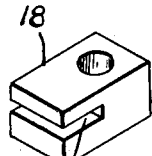
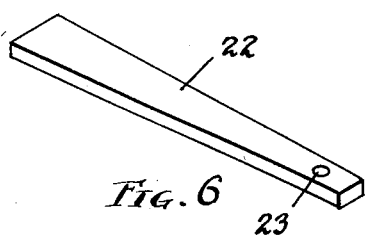
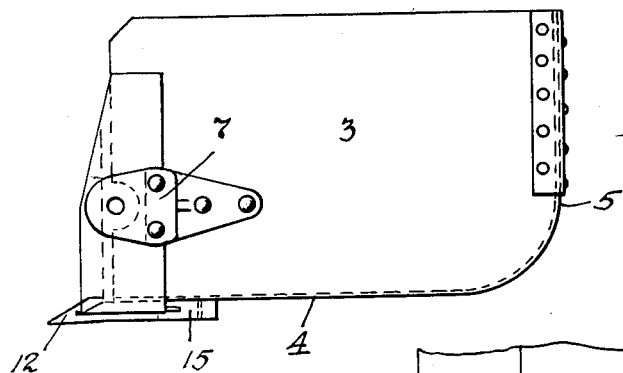
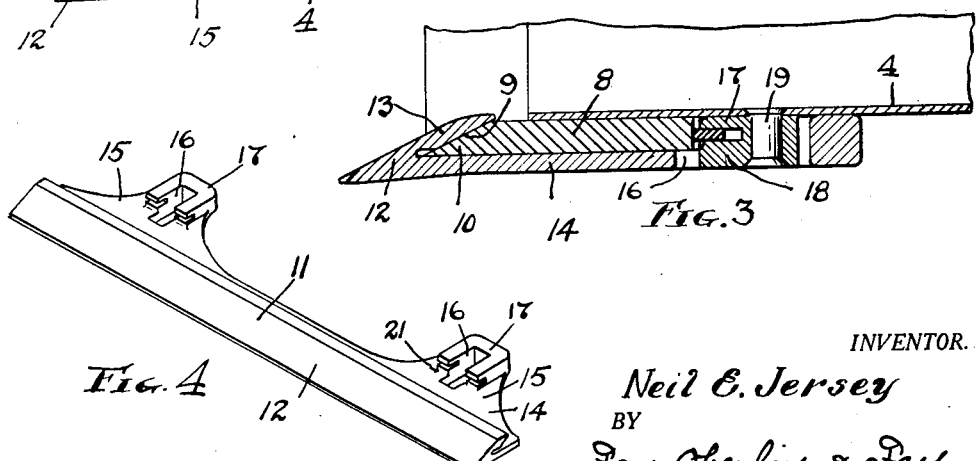
INVENTOR.
Neil E. Jersey
BY
Fay, Oberlin & Fay
ATTORNEYS.

Patented June 19, 1934

1,963,847

UNITED STATES PATENT OFFICE 1,963,847

CUTTING EDGE FOR IMPLEMENTS

Neil E. Jersey, Bucyrus, Ohio, assignor to W. A. Riddell Company, Bucyrus, Ohio, a corporation of Ohio Application August 28, 1931, Serial No. 559,888

5 Claims. (Cl. 37—141)

This invention, relating as indicated to cutting edge for implements, has more specific reference to a form of cutting edge or blade designed to be removably secured to and supported by the material-collecting lip of a scoop or the like.

The apparatus comprising my invention is, as above indicated, designed to be employed in connection with scoops and may be employed with any well known form of scoop having a material collecting and conveying bowl provided with a lip extending transversely of the forward edge of the bottom thereof, such blade being removably secured to the bowl and extending along such lip.

As is well known to those familiar with the art, considerable difficulty has been experienced in the successful operation of scoops regardless of the particular character of their construction, due to the excess wear to which the bowl of the scoop is subjected in local areas. The areas of the scoop bowl which are subject to the most wear are, first, the cutting edge of the bottom of the bowl, i. e., the lip which projects forwardly from the bottom and which is employed to gather the material from a solid bed; and, second, the bottom wall of the bowl on which the same rests in passing over the ground or like surface.

It is among the objects of the invention to provide means which, employed in connection with scoops and the like of the character described, will materially increase the efficiency of the operation of such equipment, and further, will materially increase the working life thereof. A further object of my invention is to provide a means which, due to the particular construction thereof, is readily adaptable to be easily replaced with a minimum expenditure of time and effort in making the necessary change to renew the parts worn by hard usage. Other objects of my invention will appear as the description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a plan view of a scoop bowl showing in association therewith the apparatus comprising my invention; Fig. 2 is a side elevational view of the apparatus illustrated in Fig. 1; Fig. 3 is a fragmentary transverse sectional view of the apparatus illustrated in Fig. 1, taken on a plane substantially indicated by the line 3—3; Fig. 4 is a perspective of the removable cutting edge comprising my invention; and Figs. 5 and 6 are perspective views of separate parts employed in maintaining the cutting edge illustrated in Fig. 4 in proper assembled relation on the bowl of the scoop.

Referring more specifically to the drawing, and more especially to Fig. 1, the apparatus comprising my invention is herein illustrated applied to a scoop bowl 1 which has side members 2 and 3 and a bottom member 4 which, at the rear end 5 of the scoop is curved upwardly to form the rear wall thereof.

The scoop illustrated in these figures is of the type usually suspended from a wheeled carriage and such scoop is therefore provided with the usual bracket members 6 and 7 respectively, rigidly secured to the side members 2 and 3, and by means of which the scoop may be supported or drawn. This feature of construction does not, however, form a part of my invention, so that the same will not be dealt with in any greater detail.

The bottom 4 of the scoop bowl 1, as most clearly illustrated in Fig. 3, has associated therewith along its forward edge or lip, a reinforcing member 8 which may be secured to such bottom member by spot welding, or any like suitable means. The reinforcing member 8 extends forwardly of the edge of the bottom 4, as at 9, and at such projection is provided with a tapered edge 10 for the purpose hereinafter more fully explained. This reinforcing member 8 is provided primarily to sufficiently strengthen the material gathering edge of the scoop so that as the scoop is employed to scrape material from hard beds, the gathering lip will be able to withstand the hard usage incidental to such operation.

The removable cutting edge 11 for the material gathering lip of the scoop is most clearly illustrated in Figs. 3 and 4, and consists of a nose portion 12 which has associated therewith and preferably formed integrally therewith, overlying and underlying rearwardly extending portions 13 and 14, respectively. The overlying portion 13 is preferably inclined at an angle to the underlying portion 14 equal to the inclination of the tapered edge 10 of the reinforcing member 8 and of such length that the upper terminal of such portion 13 will be substantially flush with the inner surface of the bowl bottom 4 so as to enable the material within such bowl to be freely dumped or discharged therefrom.

The underlying portion 14 of the cutting edge extends transversely of the bottom 4 along the forward edge, i. e., beneath the reinforcing member 8 and is provided at spaced points with rearwardly extending arms 15. The arms 15 are provided with apertures 16 which are preferably rectangular in form and about which on the rear side are provided bosses 17 for the purpose hereinafter more fully explained.

The bottom 4 of the scoop has secured thereto, as most clearly illustrated in Fig. 3, blocks 18 which are secured to such bottom by means of rivets 19, or the like. As most clearly illustrated in Figs. 3 and 5, the blocks 18 are preferably of a thickness equal to the combined thickness of the reinforcing portion 8 and the underlying portion 14 and are provided with transversely extending slots 20. The forward edge of the bosses 17 extending partially around the apertures 16 in the arms 15 are likewise provided with slots 21 which, when the cutting edge is in the position illustrated in Fig. 3, will be in alignment with the slots 20 in the blocks 18 so that the key 22, such as is most clearly illustrated in Fig. 6, may be inserted in such slots and by bearing against the rear edge of the reinforcing member 8, will rigidly maintain the cutting edge in proper assembled relation along the forward lip of the bowl.

The key 22, at its small end, is provided with a transversely extending aperture 23 adapted to receive a suitable cotter key or the like by means of which the same may be maintained against disassembly and loss should it become loose in the slots 20 and 21.

The key 22, in combination with the slots and the blocks 18 and the bosses 17 serves the dual purpose of maintaining proper assembled relation between the nose of the cutting edge and the tapered portion 10 of the reinforcing member 8 and in addition, prevents the underlying portion 14 from moving downwardly away from the bottom when the scoop is dropped onto a hard surface or when a rock or the like is encountered during the material gathering operation.

It is believed that the further description of the principles comprising my invention, i. e., the construction of the cutting edge for the scoop and the function performed thereby, is unnecessary for those familiar with the art. Suffice it to say that numerous changes might be made from the detailed form of construction illustrated and described herein without departing from the principles of my invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention.

1. The combination with a scoop bowl having a material-collecting lip extending along one side thereof, of a cutting blade extending along said lip, said blade having a portion extending rearwardly from the edge of said lip on the upper side thereof, and another portion integral with said blade extending along the bottom of said bowl a substantially greater distance than said upper side portion, securing posts on the under side of said bowl adapted to enter apertures formed therefor in the lower portion of said blade, and wedge means removably joining said blade to said posts.

2. The combination with a scoop bowl having a material-collecting lip extending along one side thereof, of a cutting blade extending along said lip and having integral rearwardly directed arms extending across the bottom of said bowl, projections on the bottom of said bowl, and wedge means for removably securing said arms to said projections which means are adapted to draw said cutting blade into close engagement with said collecting lip.

3. The combination with a scoop bowl having a material-collecting lip extending along one side thereof, of a cutting blade extending along said lip and having a portion underlying the bottom of said bowl, an aperture in said underlying portion, a post on the bottom of said bowl extending into said aperture, said underlying portion and said post having coinciding keyways, and a key in said keyways removably securing said blade to said bowl.

4. The combination with a scoop bowl having a material-collecting lip extending along one side thereof, of a cutting blade extending along said lip and having spaced arms extending rearwardly across the bottom of said bowl, apertures in said arms, posts on the bottom of said bowl extending into said apertures, complementary keyway slots in said posts and said arms adjacent said apertures, keys to said slots for removably supporting said blade on said bowl.

5. The combination with a scoop bowl having a material-collecting lip extending along one side thereof, of a cutting blade extending along said lip and having integral rearwardly directed arms extending across the bottom of said bowl, and wedge means adapted to draw said cutting blade into close engagement with said collecting lip and to secure said arms to said bowl.

NEIL E. JERSEY.